(12) United States Patent
Wang et al.

(10) Patent No.: US 9,800,960 B2
(45) Date of Patent: Oct. 24, 2017

(54) MONITORING OF IP MULTICAST DELIVERY OVER AN OPTICAL NETWORK

(71) Applicant: Alcatel-Lucent USA Inc., Murray Hill, NJ (US)

(72) Inventors: Shengqiang Wang, Cary, NC (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/748,073

(22) Filed: Jun. 23, 2015

(65) Prior Publication Data

US 2016/0380857 A1 Dec. 29, 2016

(51) Int. Cl.
| | |
|---|---|
| *H04J 14/00* | (2006.01) |
| *H04B 10/27* | (2013.01) |
| *H04Q 11/00* | (2006.01) |
| *H04L 12/18* | (2006.01) |
| *H04L 12/26* | (2006.01) |

(52) U.S. Cl.
CPC ....... *H04Q 11/0067* (2013.01); *H04L 12/185* (2013.01); *H04L 12/1863* (2013.01); *H04L 43/06* (2013.01); *H04L 43/0835* (2013.01); *H04Q 11/0066* (2013.01); *H04Q 2011/0047* (2013.01); *H04Q 2011/0083* (2013.01)

(58) Field of Classification Search
CPC .............. H04B 43/0829; H04B 12/185; H04Q 11/0066; H04Q 11/0067; H04Q 2011/0047; H04Q 2011/0083; H04L 43/065; H04L 12/185; H04L 12/1863; H04L 43/06; H04L 43/0835; H04L 43/0829

USPC ................................ 398/9–38, 58–64, 66–73
See application file for complete search history.

(56) References Cited

U.S. PATENT DOCUMENTS

| | | | | |
|---|---|---|---|---|
| 6,515,967 | B1 * | 2/2003 | Wei ..................... | H04L 12/1868 370/244 |
| 6,693,907 | B1 * | 2/2004 | Wesley ............... | H04L 12/1854 370/390 |
| 7,418,009 | B2 * | 8/2008 | Tominaga ............. | H04J 3/1694 370/392 |

(Continued)

OTHER PUBLICATIONS

Broadband Forum Technical Report, Internet Gateway Device Data Model for TR-069, Issue: 1.1, Issue Date: Nov. 2006.

(Continued)

*Primary Examiner* — Ken N Vanderpuye
*Assistant Examiner* — Dibson Sanchez
(74) *Attorney, Agent, or Firm* — Duft Bornsen & Fettig, LLP

(57) ABSTRACT

Apparatus and method for monitoring IP multicast delivery. One embodiment comprises an Optical Line Termination (OLT) device that includes a Network Termination (NT) device that connects to a core network, and a plurality of Line Termination (LT) devices that connect to an optical distribution network. The NT device generates an IP multicast monitoring stream directed to a group address, and transmits the monitoring stream to the LT devices. The LT devices then monitor for packets directed to the group address. When an LT device detects a loss of one or more packets directed to the group address, the LT device reports packet loss for the IP multicast monitoring stream to the NT device.

14 Claims, 8 Drawing Sheets

(56) References Cited

U.S. PATENT DOCUMENTS

| | | | | |
|---|---|---|---|---|
| 7,925,162 B2* | 4/2011 | Soto | H04B 10/2503 | 398/60 |
| 8,218,544 B2* | 7/2012 | Takeuchi | H04L 12/2801 | 370/230 |
| 8,442,401 B2* | 5/2013 | Dahlfort | H04J 14/0282 | 398/67 |
| 2002/0021662 A1* | 2/2002 | Heyningen | H04Q 11/0066 | 370/219 |
| 2002/0071149 A1* | 6/2002 | Xu | H04B 10/032 | 398/5 |
| 2004/0033075 A1* | 2/2004 | Koch | H04Q 11/0062 | 398/58 |
| 2004/0208537 A1* | 10/2004 | Lee | H04J 14/0226 | 398/41 |
| 2005/0135365 A1* | 6/2005 | Sung | H04L 12/18 | 370/390 |
| 2007/0025352 A1* | 2/2007 | Tanaka | H04L 12/2854 | 370/390 |
| 2007/0064719 A1* | 3/2007 | Tanaka | H04J 3/1694 | 370/437 |
| 2007/0264016 A1* | 11/2007 | DeLew | H04J 3/0682 | 398/71 |
| 2007/0264017 A1* | 11/2007 | Mizutani | H04J 3/1694 | 398/72 |
| 2008/0002718 A1* | 1/2008 | Bernard | H04Q 11/0067 | 370/395.51 |
| 2008/0025724 A1* | 1/2008 | Ozaki | H04Q 11/0067 | 398/68 |
| 2008/0037535 A1* | 2/2008 | Yoon | H04H 20/69 | 370/389 |
| 2008/0037981 A1* | 2/2008 | Mukojima | H04Q 11/0067 | 398/10 |
| 2008/0232794 A1* | 9/2008 | Absillis | H04B 10/0793 | 398/9 |
| 2008/0253771 A1* | 10/2008 | Noel | H04L 41/082 | 398/67 |
| 2008/0298809 A1* | 12/2008 | Zheng | H04L 12/2881 | 398/118 |
| 2009/0060496 A1* | 3/2009 | Liu | H04J 3/0682 | 398/17 |
| 2009/0245790 A1* | 10/2009 | Mizutani | H04J 14/0282 | 398/43 |
| 2009/0285106 A1* | 11/2009 | Bernard | H04L 41/065 | 370/242 |
| 2009/0285576 A1* | 11/2009 | Noel | H04J 3/14 | 398/17 |
| 2009/0290500 A1* | 11/2009 | Nishi | H04L 12/2697 | 370/246 |
| 2009/0328119 A1* | 12/2009 | Kan | H04N 7/17318 | 725/107 |
| 2010/0074614 A1* | 3/2010 | DeLew | H04B 10/272 | 398/17 |
| 2010/0246415 A1* | 9/2010 | Nishi | H04L 12/2697 | 370/248 |
| 2010/0254706 A1* | 10/2010 | Hirth | H04J 14/0282 | 398/48 |
| 2011/0026926 A1* | 2/2011 | Yamashita | H04Q 11/0067 | 398/79 |
| 2011/0235635 A1* | 9/2011 | Yadav | H04L 12/18 | 370/390 |
| 2013/0121684 A1* | 5/2013 | Smith | H04Q 11/0067 | 398/5 |
| 2014/0093232 A1* | 4/2014 | Hood | H04B 10/032 | 398/5 |
| 2014/0321845 A1* | 10/2014 | Jiang | H04Q 11/0067 | 398/5 |
| 2015/0003822 A1* | 1/2015 | Fukada | H04B 10/032 | 398/2 |
| 2015/0063811 A1* | 3/2015 | Furusawa | H04L 47/6295 | 398/66 |
| 2016/0050471 A1* | 2/2016 | Boyd | H04Q 11/0067 | 398/51 |
| 2016/0295307 A1* | 10/2016 | Kikuzawa | H04Q 11/0067 | |

OTHER PUBLICATIONS

Cable Data Services, DOCSIS Provisioning of EPON Specifications, DPoE MAC and Upper Layer Protocols Interface Specification, DPoE-SP-MULPIv2.0I05-140327, Mar. 27, 2014, Cable Television Laboratories, 2011-2014.

Technical Report, DSL Forum, CPE WAN Management Protocol, May 2004, Produced by: DSLHome-Technical Working Group.

W. Fenner, Internet Group Management Protocol, Version 2, Xerox PARC, The Internet Society, Nov. 1997.

Cable Data Services, DOCSIS Provisioning of EPON Specifications, DPoE OAM Extension Specification, DPoE-SP-OAMv2.0-105-140327, Mar. 27, 2014, Cable Television Laboratories, Inc. 2011-2014.

Series G: Transmission Systems and Media, Digital Systems and Networks, Digital sections and digital line system—Optical line systems for local and access networks, Gigabit-capable Passive Optical Networks (G-PON): ONT management and control interface specification, ITU-T, G984.4, Feb. 2008.

\* cited by examiner

MONITORING OF IP MULTICAST DELIVERY OVER AN OPTICAL NETWORK

FIELD OF THE INVENTION

The invention is related to the field of communication systems and, in particular, to IP multicast delivery.

BACKGROUND

Internet Protocol (IP) multicast refers to the sending of packets to a group of receivers. An IP multicast group address is established, and senders and receivers use the group address to send and receive an IP multicast stream of packets. A source uses the group address as the IP destination address in the packets. Receivers use the group address to inform the network that they want to receive packets sent to that group address. The protocol typically used by receivers to join a group is referred to as the Internet Group Management Protocol (IGMP).

IP multicasting may be used to deliver Internet Protocol Television (IPTV) content. IPTV is a service through which television and other video content is delivered to an end user over a packet-switched network, such as the Internet. An IPTV subscriber receives a set-top box (STB) from the IPTV provider, which is also typically the internet service provider for the subscriber. The STB is able to access the IPTV service over the internet through other equipment at the customer premises, such as a modem, an Optical Network Termination (ONT), a residential gateway, etc. This equipment connects the STB to an access network that provides connectivity to the internet. For example, the access network may comprise a Digital Subscriber Line (xDSL) network, a Passive Optical Network (PON), a cable network, etc. When connected to the Internet, IPTV servers provide video stream(s) to the STB for viewing over the subscriber's television or other suitable display. The IPTV subscriber can view an Electronic Programming Guide (EPG) displayed by the STB, and select programs or videos to watch.

IP multicast delivery is advantageous because it provides efficient bandwidth usage over the Internet and/or over the access network. For example, a sender transmits packets of an IP multicast stream to a group address where the packets include content desired by the receiver, such as IPTV content. Nodes in the network (e.g., switches, routers, etc.) replicate the packets of the IP multicast stream so that the packets reach each receiver in the group. The sender only has to send the packets of the IP multicast stream once, and the network infrastructure replicates the IP multicast stream for delivery to the receivers. Internet service providers may reserve bandwidth for IPTV services or other IP multicast delivery services so that a quality of delivery may be guaranteed. Despite the guaranteed quality of delivery for IP multicast delivery, nodes and/or links in the network may become defective which interrupts transmission of an IP multicast stream. Therefore, a subscriber may not be able to view the content. For IPTV service in particular, troubleshooting is a main contributor to the high operational cost of the IPTV service. Therefore, service providers continue to look for ways to quickly and easily detect a node or link at fault, and report the fault to a management system.

SUMMARY

Embodiments described herein provide for monitoring of IP multicast delivery over an optical network, such as a Gigabit Passive Optical Network (GPON). A node in the network generates an IP multicast stream that is used exclusively for monitoring the optical network. The node then forwards the monitoring stream to downstream nodes. The downstream nodes monitor for packet loss on the monitoring stream, and report if packet loss is detected. The service provider can then troubleshoot problems based on the reports regarding the monitoring stream.

One embodiment comprises an Optical Line Termination (OLT) device. The OLT device includes a Network Termination (NT) device configured to connect to a core network, and a plurality of Line Termination (LT) devices configured to connect to optical fibers of an optical distribution network. The NT device includes a monitoring device configured to generate an IP multicast monitoring stream directed to a group address, and to transmit the IP multicast monitoring stream to the LT devices. The LT devices are configured to monitor for packets directed to the group address. One or more of the LT devices is configured to detect a loss of one or more packets directed to the group address, and to report packet loss for the IP multicast monitoring stream to the monitoring device.

In another embodiment, after reporting the packet loss, the LT device is configured to detect that packets directed to the group address are successfully received over a time interval, and to report to the monitoring device that the packet loss detected by the LT device has ended.

In another embodiment, the monitoring device is configured to send a control message to the LT devices indicating the group address for the IP multicast monitoring stream.

In another embodiment, the IP multicast monitoring stream is unencrypted, and each of the packets of the IP multicast monitoring stream includes a sequence number and a timestamp.

In another embodiment, the LT device is configured to forward the IP multicast monitoring stream over an optical fiber to an Optical Network Termination (ONT) device at a customer premises. The LT device is configured to receive a message from the ONT device indicating packet loss for the IP multicast monitoring stream detected by the ONT device, and to report the packet loss detected by the ONT device to the NT device.

In another embodiment, the LT device is configured to receive a message from the ONT device indicating that the packet loss has ended for the IP multicast monitoring stream, and to report that the packet loss detected by the ONT device has ended.

In another embodiment, an interface between the LT devices and the ONT device comprises an ONT Management and Control Interface (OMCI) defined by the International Telegraph Union Telecommunication Standardization Sector (ITU-T). The OMCI includes a new attribute for indicating the group address for the IP multicast monitoring stream, and a new attribute for indicating the packet loss detected by the ONT device.

In another embodiment, the NT device connects to the LT device over a plurality of links. The monitoring device is configured to transmit the IP multicast monitoring stream to the LT device over each link one at a time for a defined interval.

Another embodiment comprises a method for monitoring IP multicast delivery. The method includes generating an IP multicast monitoring stream directed to a group address at an NT device, and transmitting the IP multicast monitoring stream from the NT device to the LT devices. The method further includes monitoring for packets directed to the group address at the LT devices. The method further includes detecting a loss of one or more packets directed to the group address at an LT device, and reporting packet loss for the IP multicast monitoring stream detected at the LT device to the NT device.

Another embodiment comprises an ONT device at a customer premises that connects with an OLT device over an optical fiber. The ONT device is configured to monitor for packets of an IP multicast monitoring stream that are directed to a group address, to detect a loss of at least one packet directed to the group address, and to transmit a message to the OLT device indicating packet loss for the IP multicast monitoring stream.

In another embodiment, after indicating the packet loss, the ONT device is configured to detect that packets directed to the group address are successfully received over a time interval, and to transmit a message to the OLT device indicating that the packet loss has ended for the IP multicast monitoring stream.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
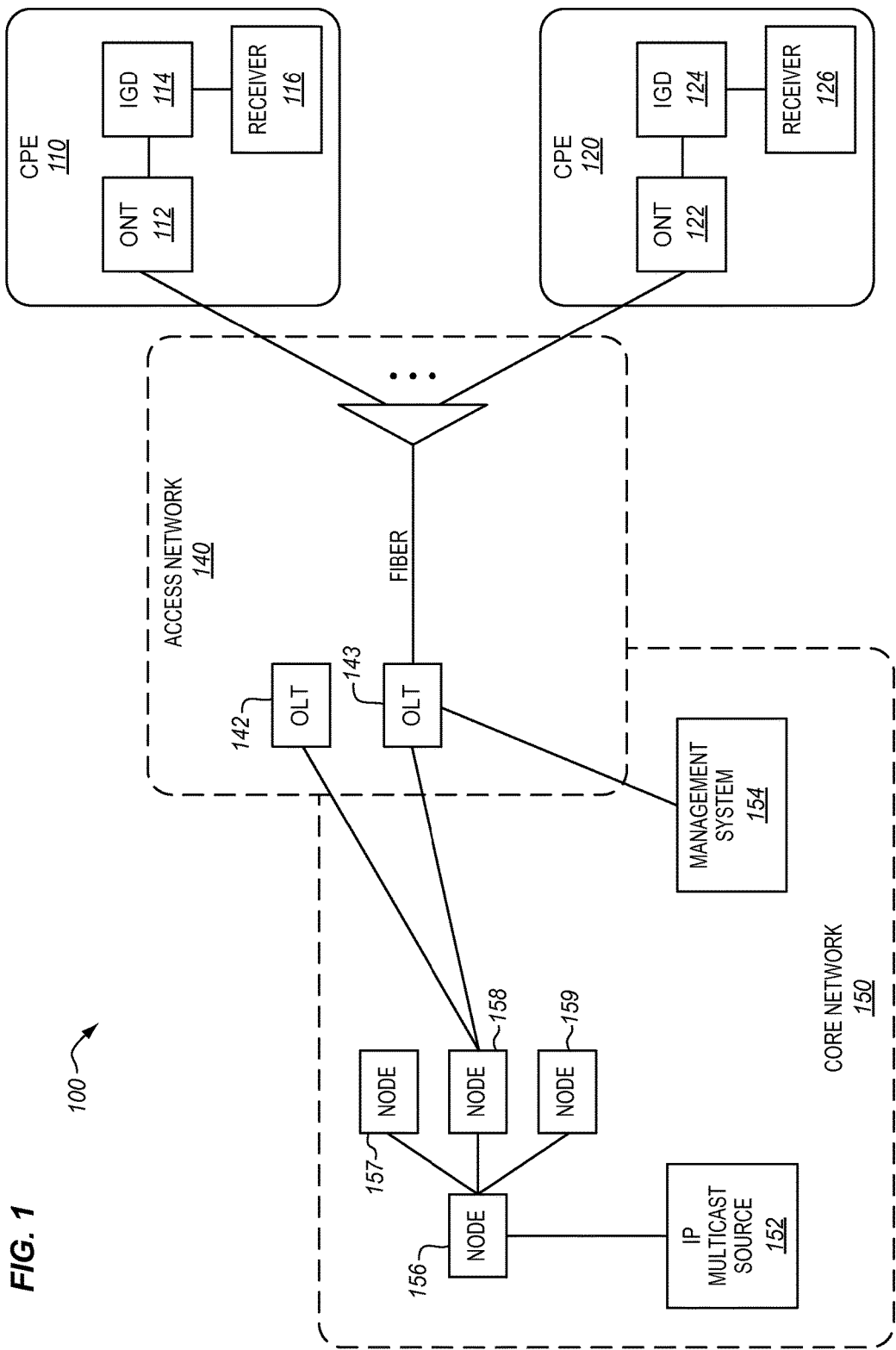
FIG. 1 illustrates a communication network for IP multicast delivery in an exemplary embodiment.

FIG. 1 illustrates a communication network 100 for IP multicast delivery in an exemplary embodiment. One assumption for FIG. 1 is that end users subscribe to an IP multicast service. One end user has Customer Premises Equipment (CPE) 110, which represents the equipment, terminals, devices, etc., of a customer that are configured to connect to a provider's network. For example, CPE 110 includes an Optical Network Termination (ONT) device 112, an internet gateway device (IGD) 114, and a receiver 116. ONT device 112 (which may also be referred to as an Optical Network Unit (ONU)) acts as a termination point in a customer premises for an access network. In this embodiment, ONT device 112 acts as a termination point for an optical distribution network (e.g., a Passive Optical Network (PON)). Internet gateway device 114 comprises any device or equipment that connects one or more end user devices (e.g., computer, laptop, tablet, smart phone, etc.) in the customer premises to the Internet or other Wide Area Network (WAN). One example of internet gateway device 114 is a residential gateway, which manages the connection and sharing of an internet service among end user devices. Receiver 116 comprises a component or device that is configured to join an IP multicast group, and receive an IP multicast stream for the group that includes content. One example of receiver 116 is a set-top box for an IPTV service that is able to receive and decode IPTV content delivered in an IP multicast stream. CPE 120 includes similar equipment, with an ONT 122, an internet gateway device (IGD) 124, and a receiver 126.

Communication network 100 includes an access network 140 that connects CPE 110 and 120 to a core network 150. Core network 150 comprises a packet-switched (PS) network that is able to transport IP multicast streams. The most common example of core network 150 is the Internet, but IP multicast streams may be transported over other types of PS networks. Access network 140 comprises an optical network that connects customers to core network 150, such as a PON. Access network 140 includes a plurality of Optical Line Termination (OLT) device 142-143 that are able to deliver IP multicast streams over an optical fiber to customer premises.

Core network 150 includes an IP multicast source 152, a management system 154, and a plurality of nodes 156-159. IP multicast source 152 represents a node that sends an IP multicast stream destined for a group address, where the IP multicast stream includes content requested by end users/subscribers. For example, IP multicast source 152 may comprise an IPTV head end or IPTV server that delivers IPTV content using IP multicast delivery. Although IP multicast source 152 is shown in core network 150, it may be external to core network 150.

Management system 154 comprises a server or group of servers that manage IP multicast services or group services. One example of management system 154 is an Operations Support System (OSS). Management system 154 may monitor for faults regarding IP multicast services, monitor usage of the IP multicast services, etc. Nodes 156-159 (also referred to as network elements) are able to deliver IP multicast streams. For example, nodes 156-159 may represent routers or network switches in core network 150 that are able to replicate an IP multicast stream, and forward the IP multicast stream toward the receivers in the group.

In an exemplary operation, IP multicast source 152 sends an IP multicast stream to node 156, which replicates the IP multicast stream and forwards it to nodes 157-159. Node 158 also replicates the IP multicast stream, and forwards it to OLT devices 142-143 in access network 140. OLT device 143 replicates the IP multicast stream, and forwards it to CPE 110 and CPE 120. Despite the guaranteed quality of delivery for IP multicast, sometimes nodes and/or links become defective which causes the IP multicast stream to stop. For example, when OLT device 143 is defective and does not replicate and forward the IP multicast stream, CPE 110 and CPE 120 will not receive the IP multicast stream. The following embodiments describe a way to monitor for faults in the network using a monitoring stream.

Figure 2:
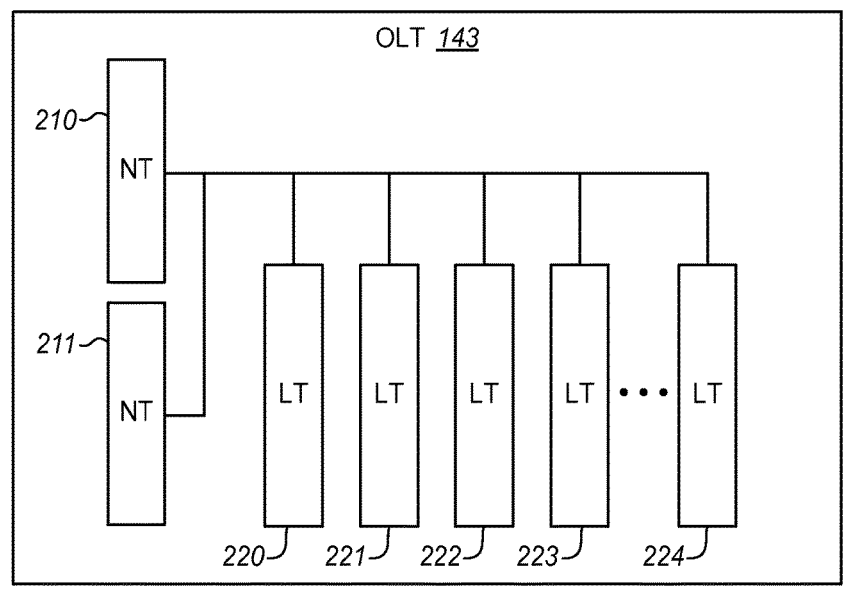
FIG. 2 is a schematic diagram of an Optical Line Termination (OLT) device in an exemplary embodiment.

FIG. 2 is a schematic diagram of OLT device 143 in an exemplary embodiment. Generally, an OLT device is a device that connects to ONT devices over an optical distribution network (ODN), and terminates the common endpoint of an ODN. An OLT device also provides management and maintenance functions for the ODN and ONT devices. OLT device 143 includes one or more Network Termination (NT) devices 210-211. A NT device is a device or component that links OLT device 143 to core network 150. OLT device 143 also includes a plurality of Line Termination (LT) devices 220-224. A LT device is a device or component that links OLT device 143 to customer premises equipment over an optical fiber, which may be referred to as a local loop. Each instance of an NT device or LT device may comprise a blade server, a virtual machine, or some other type of equipment.

Figure 3:
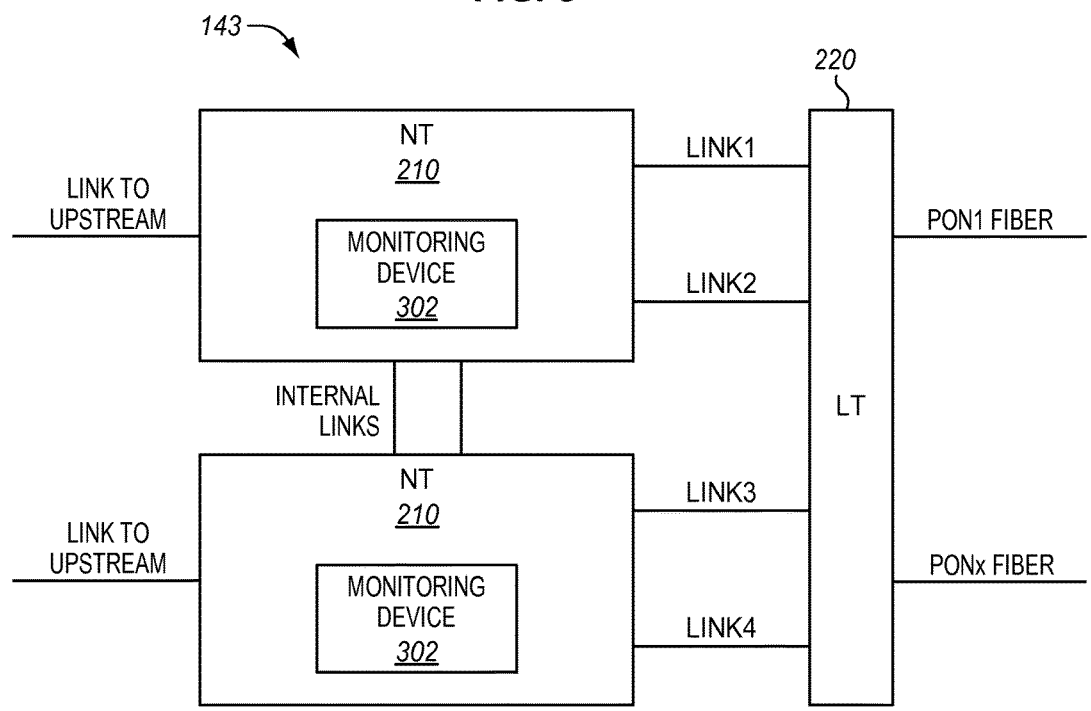
FIG. 3 is a schematic diagram of connections between NT devices and LT devices in an OLT device in an exemplary embodiment.

FIG. 3 is a schematic diagram of connections between NT devices and LT devices in an OLT device in an exemplary embodiment. Each NT device 210-211 may have one or more links connected to an upstream switch or router to receive IP multicast streams in addition to normal unicast traffic. One of NT devices 210-211 may act as an active device, with the other device acting as standby for redundancy. There may be one or more internal links between NT devices 210-211. NT devices 210-211 each have one or more links to LT devices 220-224. As shown in FIG. 3, NT device 210 has two (or more) links to LT device 220, and NT device 211 also has two (or more) links to LT device 220. LT device 220 connects to one or more fibers of the ODN (illustrated as PON fibers 1-*x*).

In this embodiment, NT devices 210-211 include a monitoring device 302 that is configured to monitor for faults in downstream elements using an IP multicast monitoring stream. Monitoring device 302 may comprise hardware (e.g., a processor, memory, circuitry, gate array, etc.), software, or a combination of both. An IP multicast monitoring stream is generated specifically to monitor for faults in downstream elements, as opposed to an IP multicast stream that carries actual content, such as IPTV content. In one embodiment, each packet of the IP multicast monitoring stream includes a sequence number and a timestamp. The IP multicast monitoring stream is unencrypted so that the downstream elements can extract the sequence numbers and timestamps from the packets. The payload of the packets may be empty, as the purpose of delivering the monitoring stream is to monitor for faults in the network instead of delivering content to end users. The IP multicast monitoring stream may also have a configurable packet rate, such as 100 packets per second.

LT device 220 (and the other LE devices) is able to monitor for packet loss on the IP multicast monitoring stream. LT device 220 is also able to report packet loss on the IP multicast monitoring stream to monitoring device 302. Similar monitoring is performed in other downstream elements, such as ONT devices 112 and 122 (see FIG. 1). A more detailed description of monitoring for packet loss is provided below in FIGS. 4-6.

Figure 4:
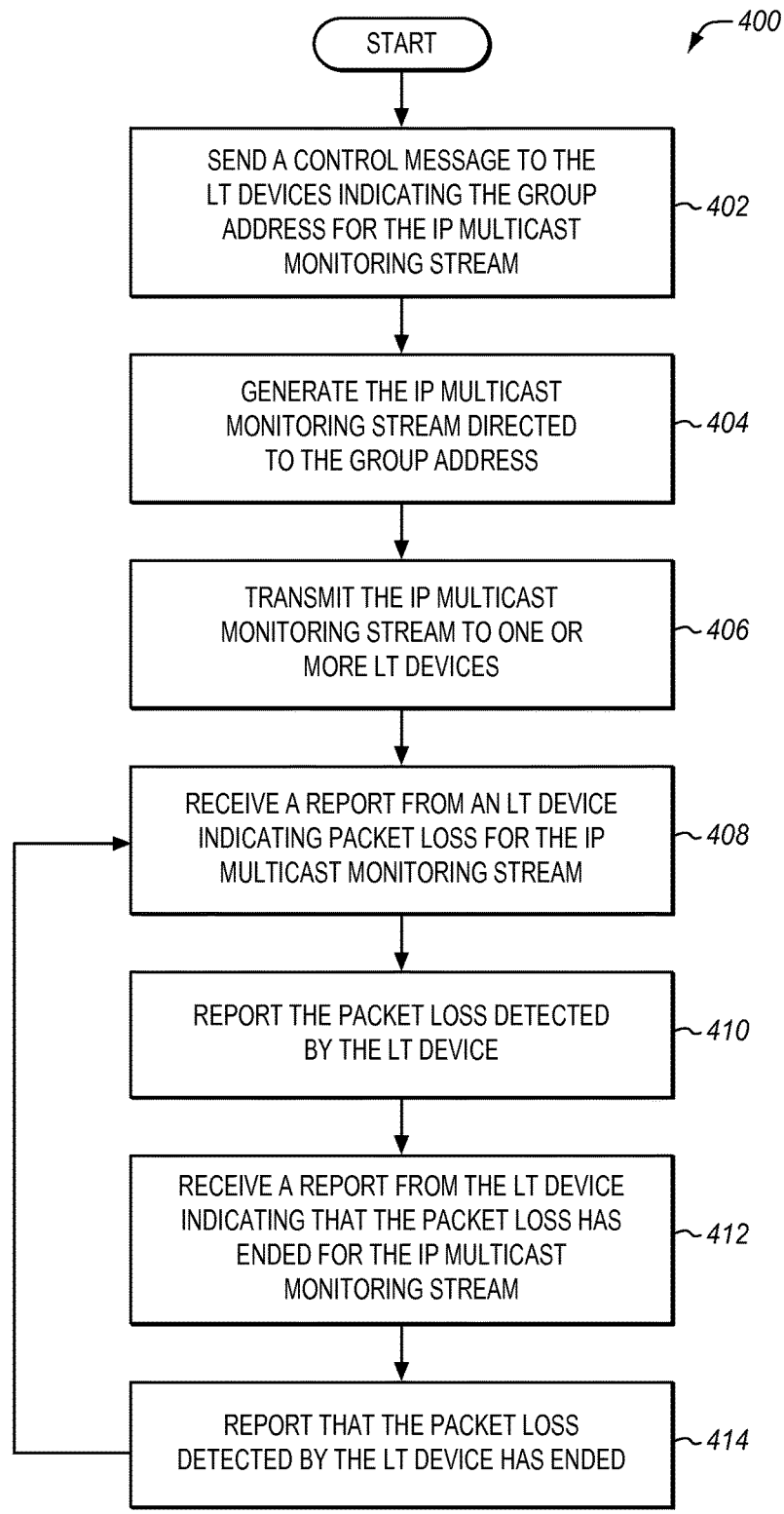
FIG. 4 is a flow chart illustrating a method performed in NT devices for monitoring packet loss in an exemplary embodiment.

FIG. 4 is a flow chart illustrating a method 400 performed in NT devices for monitoring packet loss in an exemplary embodiment. The steps of method 400 will be described with reference to OLT device 143 in FIGS. 2-3, but those skilled in the art will appreciate that method 400 may be performed in other systems. Also, the steps of the flow charts described herein are not all inclusive and may include other steps not shown, and the steps may be performed in an alternative order.

NT devices 210-211 are enhanced in the following embodiment to provide a monitoring stream to downstream elements. Monitoring device 302 (such as in NT device 210) may begin by sending a control message to LT devices 220-224 indicating the group address for the IP multicast monitoring stream (step 402). This control message instructs the LT devices 220-224 which group address to monitor for the IP multicast monitoring stream, such as group address 224.0.2.8. The control message may be sent over a proprietary interface of the service provider, or any other interface used between NT devices 210-211 and LT devices 220-224. The group address for the IP multicast monitoring stream may alternatively be a default address that is pre-provisioned into LT devices 220-224, in which case step 402 is optional.

Monitoring device 302 generates the IP multicast monitoring stream directed to the group address (step 404). In "generating" the IP multicast monitoring stream, monitoring device 302 may format the packets for the IP multicast monitoring stream according to criteria established by the service provider. Alternatively, monitoring device 302 may receive the IP multicast monitoring stream from management system 154 or another system in the network. Monitoring device 302 then transmits the IP multicast monitoring stream to one or more of the LT devices 220-224 (step 406). For example, monitoring device 302 may continuously transmit the IP multicast monitoring stream over link1 to LT device 220 for a time interval. Monitoring device 302 may then switch over to link2, and transmit the IP multicast monitoring stream over link2 to LT device 220 for a time interval. In other words, monitoring device 302 transmits the IP multicast monitoring stream over each link between the two NT devices 210-211 and LT device 220; one at a time for a defined interval. This way all links are being examined during the operation. In addition to this, the network operator may be able to overwrite this behavior and selectively direct the IP multicast monitoring stream to a certain link for troubleshooting purposes. For example, when LT device 220 detects a packet loss of the IP multicast monitoring stream, one of the links could be at fault. To find out which link is at fault, the network operator can selectively direct the IP multicast monitoring stream to a link and then check the monitoring status of LT device 220. Monitoring device 302 may transmit the IP multicast monitoring stream to the other LT devices 221-224 in a similar manner.

Figure 5:
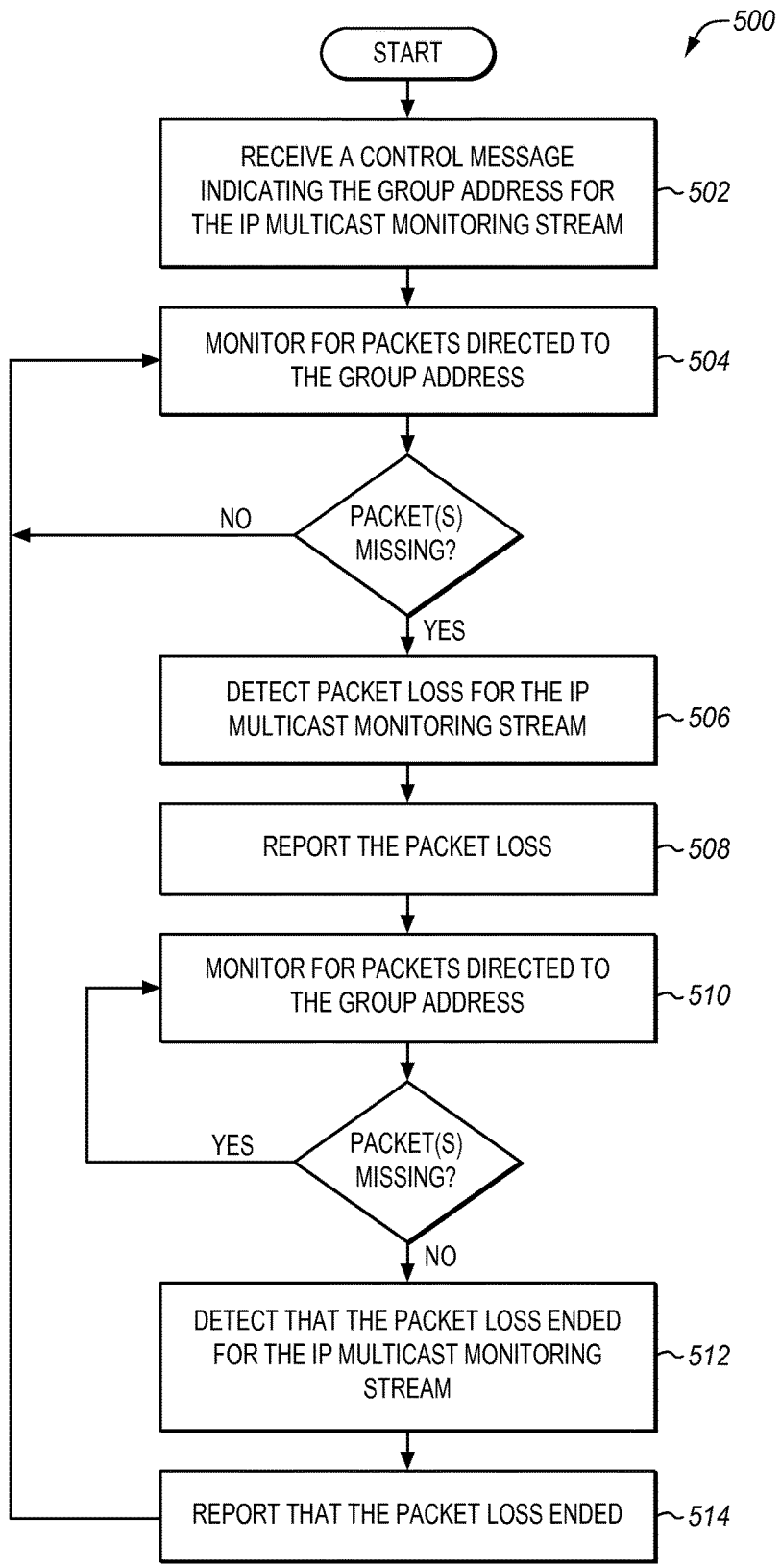
FIG. 5 is a flow chart illustrating a method performed in an LT device or ONT device for monitoring packet loss in an exemplary embodiment.

FIG. 5 is a flow chart illustrating a method 500 performed in an LT device for monitoring packet loss in an exemplary embodiment. LT devices 220-224 are enhanced to monitor for packet loss on the monitoring stream, and report any packet loss upstream. LT device 220, for example, may receive the control message from monitoring device 302 indicating the group address for the IP multicast monitoring stream (step 502). This step is optional, as the group address may be a default address pre-provisioned in LT device 220. LT device 220 then monitors for packets directed to the group address of the IP multicast monitoring stream (step 504). The packets in the IP multicast monitoring stream are sent in sequence according to a sequence number and a timestamp in the packet headers. LT device 220 is able to process the sequence numbers and timestamps in the packets of the IP multicast monitoring stream to determine if each packet of the IP multicast monitoring stream is successfully received. If LT device 220 fails to identify or process one or more packets directed to the group address, then LT device 220 detects a packet loss for the IP multicast monitoring stream (step 506). For example, if LT device 220 receives a packet directed to the group address with the sequence number 1000 and then receives a packet with the sequence number 1002, then LT device 220 determines packet loss for the IP multicast monitoring stream because a packet with the sequence number 1001 is missing. The threshold for determining packet loss may be provisioned by the service provider. In one instance, the loss of a single packet of the IP multicast monitoring stream may result in a determination of a packet loss. In other instances, the loss of a threshold percentage or threshold number of packets may result in a determination of packet loss. For example, if 5 or more packets are lost during a time interval (e.g., 15 seconds), then LT device 220 may detect packet loss for the monitoring stream.

LT device 220 then reports the packet loss for the IP multicast monitoring stream to monitoring device 302 (step 508). In FIG. 4, monitoring device 302 receives the report from LT device 220 indicating packet loss for the IP multicast monitoring stream (step 408), and reports the packet loss detected by LT device 220 to management system 154 (step 410).

When management system 154 receives a report from monitoring system 302 indicating a packet loss detected by LT device 220, the service provider is able to troubleshoot the fault(s) based on the report from LT device 220 and reports from other devices. When the service provider fixes the fault, it is assumed that NT device 210 again transmits the IP multicast monitoring stream to the group address (step 406). In FIG. 5, LT device 220 monitors for packets directed to the group address (step 510). If LT device 220 detects that packets for the IP multicast monitoring stream are successfully received over a time interval, then LT device 220 detects that the packet loss ended for the IP multicast monitoring stream (step 512). To successfully receive packets for the IP multicast monitoring stream, LT device 220 receives the packets in sequence over the time interval. For example, if LT device 220 receives packets directed to the group address in sequence for 1 minute, 5 minutes, 10 minutes, etc., then LT device 220 may detect that the packet loss has ended. This time interval may be provisioned by the service provider. LT device 220 then reports to monitoring device 302 that the packet loss detected in LT device 220 has ended (step 514). In FIG. 4, monitoring device 302 receives the report from LT device 220 indicating that the packet loss has ended or cleared for the IP multicast monitoring stream (step 412), and reports to management system 154 that the packet loss detected by LT device 220 has ended (step 414).

Each LT device 220-224 in OLT device 143 may monitor the IP multicast monitoring stream in a similar manner, and report any packet loss that is detected. The reports of packet loss from the LT devices 220-224 may be used to locate a fault in the network. For example, if packet loss is detected in LT device 220 but not in any other LT devices, then the service provider may locate a fault in LT device 220 or in a link between NT device 210 and LT device 220.

Figure 6:
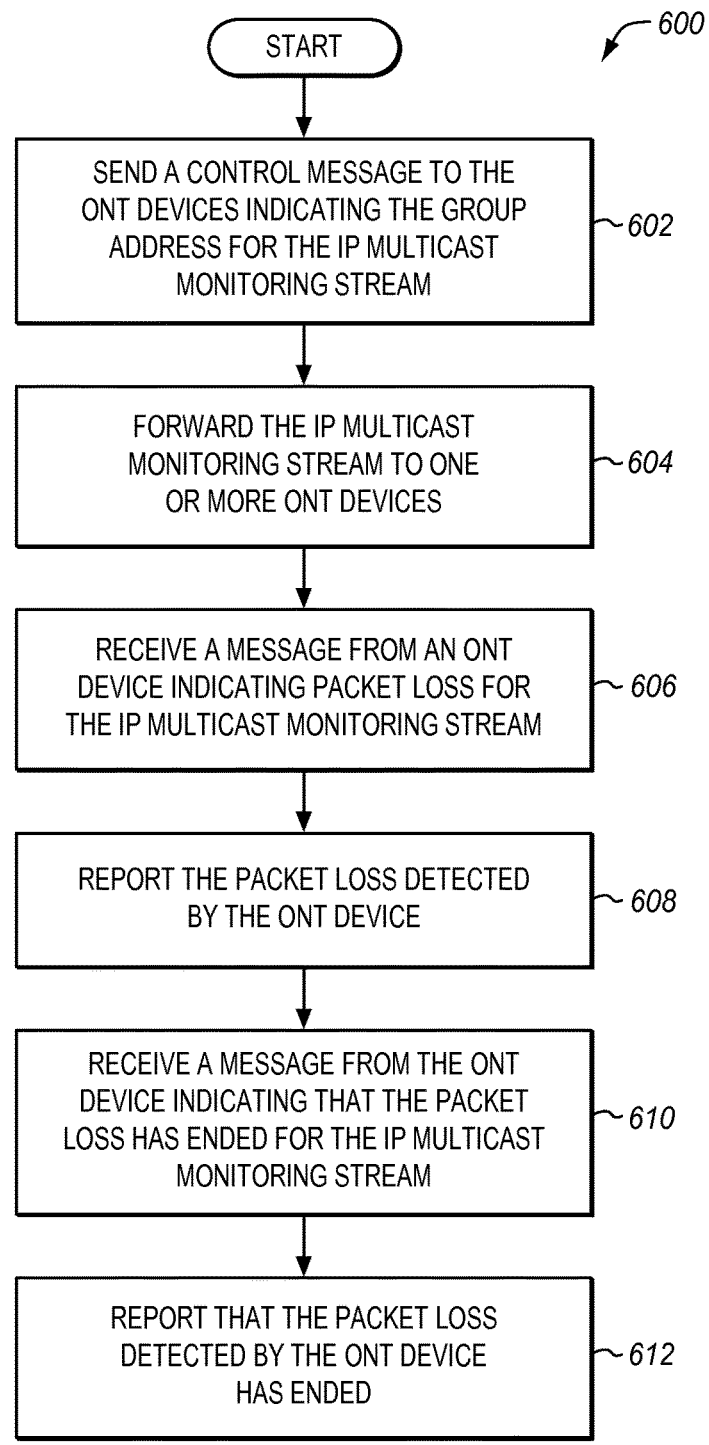
FIG. 6 is a flow chart illustrating a method performed in the LT devices for monitoring packet loss in an exemplary embodiment.

A similar type of monitoring may take place in downstream elements, such as ONT devices 112 and 122 (see FIG. 1). LT devices 220-224 are enhanced to provide the monitoring stream to the downstream elements. FIG. 6 is a flow chart illustrating a method 600 performed in the LT devices for monitoring packet loss in an exemplary embodiment. LT device 220, for example, may send a control message to ONT devices 112 and 122 indicating the group address for the IP multicast monitoring stream (step 602). This control message instructs the ONT devices 112 and 122 which group address to monitor for the IP multicast monitoring stream, such as group address 224.0.2.8. The control message may be sent over the ONT Management and Control Interface (OMCI) defined by the International Telegraph Union Telecommunication Standardization Sector (ITU-T), or any other interface used between LT devices 220-224 and ONT devices 112 and 122. The group address for the IP multicast monitoring stream may alternatively be a default address that is pre-provisioned into ONT devices 112 and 122, in which case step 602 is optional.

LT device 220 forwards the IP multicast monitoring stream directed to the group address (step 604) over one or more optical fibers of the ODN. The optical fibers are connected to ONT devices 112 and 122. ONT device 112, for example, may then perform a similar process as described in FIG. 5. ONT device 112 may receive the control message from LT device 220 indicating the group address for the IP multicast monitoring stream (step 502). This step is optional, as the group address may be a default address. ONT device 112 then monitors for packets directed to the group address of the IP multicast monitoring stream (step 504). If ONT device 112 fails to identify one or more packets directed to the group address, then ONT device 112 detects a packet loss for the IP multicast monitoring stream (step 506). ONT device 112 then reports the packet loss for the IP multicast monitoring stream by transmitting a message to LT device 220 (step 508). In FIG. 6, LT device 220 receives a message from ONT device 112 indicating packet loss for the IP multicast monitoring stream (step 606), and reports the packet loss detected by ONT device 112 to monitoring device 302 (step 608). Monitoring device 302 in turn reports the packet loss detected by ONT device 112 to management system 154.

When management system 154 receives a report indicating a packet loss for the IP multicast monitoring stream, the service provider is able to troubleshoot the fault(s) based on the report from ONT device 112 and reports from other devices. When the service provider fixes the fault, it is assumed that LT device 220 forwards the IP multicast monitoring stream to the group address over the ODN. In FIG. 5, ONT device 112 again monitors for packets directed to the group address (step 510). If ONT device 112 detects that packets for the IP multicast monitoring stream are successfully received over a time interval, then ONT device 112 detects that the packet loss ended for the group address (step 512). ONT device 112 then reports that the packet loss for the IP multicast monitoring stream has ended or cleared by transmitting a message to LT device 220 (step 514). In FIG. 6, LT device 220 receives a message from ONT device 112 indicating that the packet loss has ended or cleared for the IP multicast monitoring stream (step 610), and reports to monitoring device 302 that the packet loss detected by ONT device 112 has ended (step 612). Monitoring device 302 in turn reports to management system 154 that the packet loss detected by ONT device 112 has ended.

Each ONT device 112 and 122 may monitor the IP multicast monitoring stream in a similar manner, and report any packet loss that is detected. The reports of packet loss from the ONT devices may additionally be used to find a location of a fault.

The interface between OLT device 143 and ONT devices 112 and 122 may comprise the OMCI defined by ITU-T in recommendation G.984.4. The OMCI specification describes ONT configuration management, fault management, and performance management. In order to implement the monitoring described herein, modifications may be made to OMCI to add a new attribute for indicating the group address for the IP multicast monitoring stream. As discussed above, an LT device may send a control message to an ONT device indicating the group address for the IP multicast monitoring stream. Presently, OMCI does not provide a way for an LT device to inform an ONT device of the group address. Therefore, a new attribute for the group address is proposed herein. Additionally, a new attribute may be added to OMCI for indicating the packet loss detected by an ONT device. Presently, OMCI provides for an alarm if an entire IP multicast stream is lost. However, OMCI does not presently provide a way for an ONT device to report packet loss for an IP multicast stream as opposed to stream loss. Therefore, a new attribute is proposed herein that indicates packet loss detected in an ONT device. This new attribute may indicate whether or not packet loss exists, may indicate a rate of packet loss, etc.

The proposed attributes may be added to the ITU-T recommendation G.984.4. For instance, section 9.3.27 in G.984.4 describes the "Multicast operations profile", and lists multiple attributes for this profile. In one proposal, the following attribute is added to section 9.3.27:

Monitoring group table: This attribute is the group address for the IP multicast monitoring stream. An OLT device uses this attribute to inform an ONT device of the group address for the IP multicast monitoring stream. An ONT device automatically joins this channel and begins to detect and report packet loss on this channel. Each entry is a vector of the following components:

VLAN ID, 0 if not used (2 bytes);
Source IP address, 0.0.0.0 if not used (4 bytes);
Multicast destination IP address (4 bytes).

The attribute "Monitoring group table" is in addition to the attribute "Lost groups list table" also provided in section 9.3.27 of G.984.4. The "Lost groups list table" is a list of groups from the dynamic access control list table for which there is an active join, but no downstream flow is present, possibly because of a source failure, but also possibly because of misconfiguration somewhere upstream. In another proposal, the "Lost groups list table" is modified to add a packet loss attribute. According to the modification suggested herein, each entry is a vector of the following components:

VLAN ID, 0 if not used (2 bytes);
Source IP address, 0.0.0.0 if not used (4 bytes);
Multicast destination IP address (4 bytes);
Packet loss rate.

The packet loss rate attribute has been added to the "Lost groups list table" to indicate the rate of packet loss detected within an ONT device. The packet loss rate is 100% if an ONT device does not detect any packets for a channel. The packet loss rate is 0% if an ONT device does not detect any packet loss or if a prior packet loss has cleared. A packet loss rate in the range of 0% and 100% indicates the level of packet loss detected within an ONT device.

EXAMPLES

Figure 7:
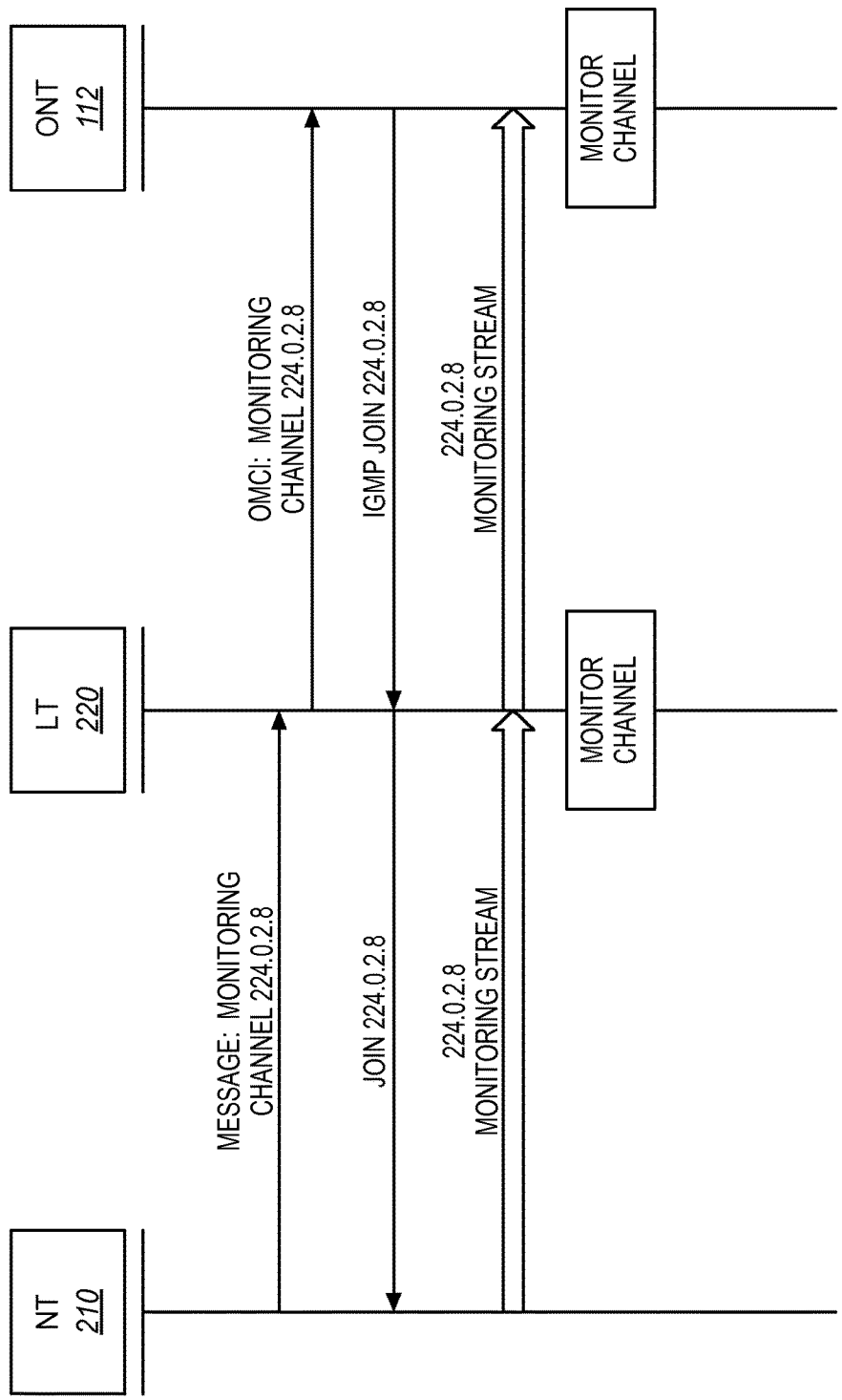
FIG. 7 is a message diagram illustrating packet loss monitoring in an exemplary embodiment.

The following illustrates different scenarios of monitoring the transport of multicast streams within an optical network. FIG. 7 is a message diagram illustrating packet loss monitoring in an exemplary embodiment. Packet loss is detected using an IP multicast monitoring stream that is sent downstream. To begin monitoring, NT device 210 sends a control message to LT device 220 indicating the group address for the IP multicast monitoring stream. It is assumed for this embodiment that the group address is "224.0.2.8", which may be referred to as monitoring channel 224.0.2.8. Each device that participates in packet loss monitoring may join this channel. LT device 220 sends an OMCI message to ONT device 112 indicating that the monitoring channel is 224.0.2.8. As described above, a new attribute is defined for OMCI indicating the group address for the IP multicast monitoring stream.

The Internet Group Management Protocol (IGMP) is a protocol used by IP hosts to report their multicast group memberships to any immediately-neighboring multicast routers (see RFC 2236 of the Internet Engineering Task Force (IETF)). For example, if a receiver wants to join an IP multicast stream, then it may send an IGMP join group request to an upstream router. In order to join the monitoring channel, ONT device 112 sends an IGMP Join message to LT device 220 to join the monitoring channel. LT device 220 then forwards the Join message to NT device 210.

NT device 210 transmits the IP multicast monitoring stream to LT device 220 on the monitoring channel (224.0.2.8). LT device 220 in turn forwards the IP multicast monitoring stream to ONT 112. The IP multicast monitoring stream may have a configurable packet rate (e.g., 100 packets per second), a configurable packet size (e.g., 64 bytes), and the same VLAN ID and priority bit as a normal multicast stream. Each packet in IP multicast monitoring stream contains an RTP header which indicates a sequence number and timestamp. LT device 220 and ONT device 112 then monitor the monitoring channel for packet loss. As the packets have a sequence number and timestamp, LT device 220 and ONT device 112 are able to detect and report packet loss and abnormal jitters on the monitoring channel.

Figure 8:
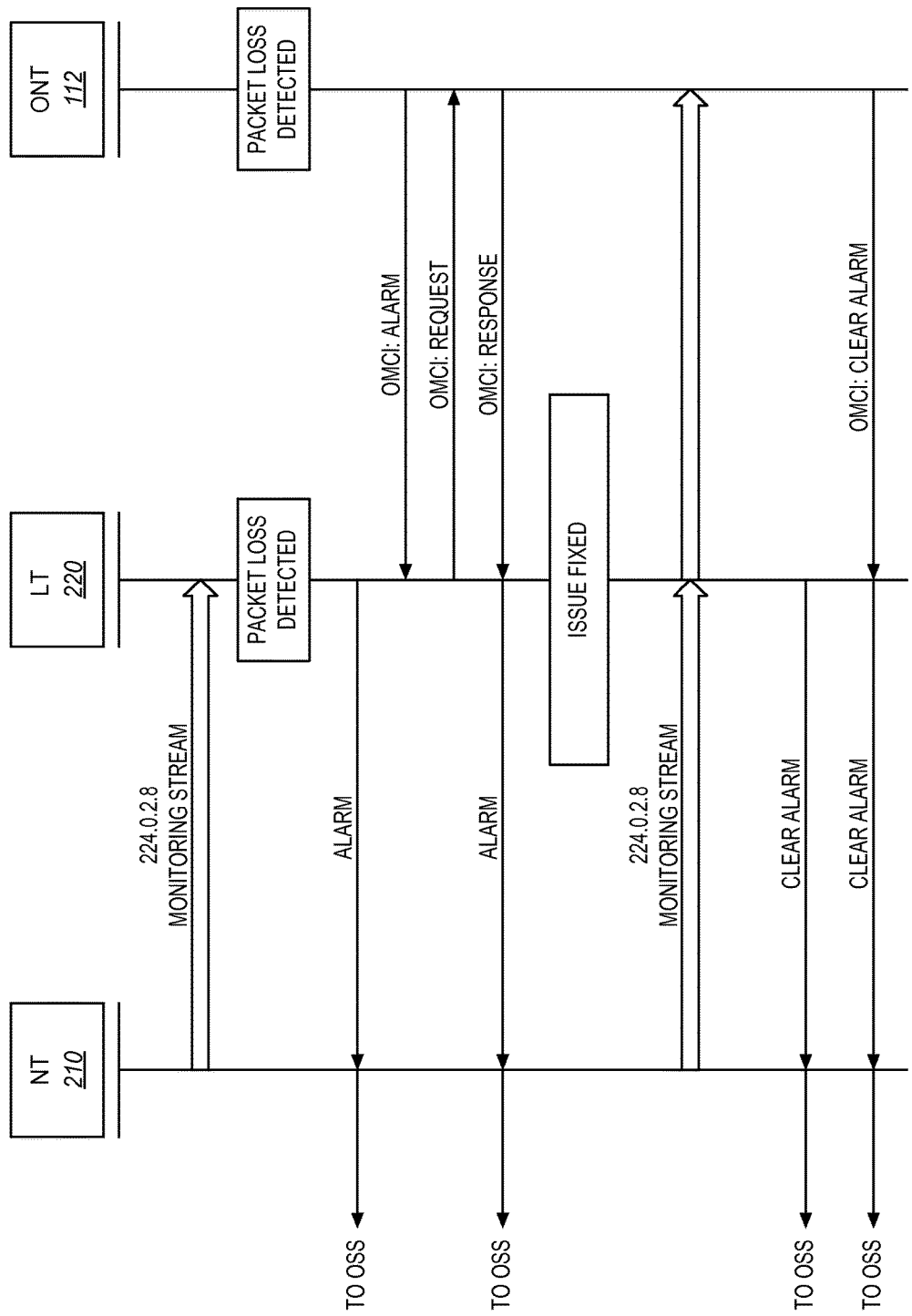
FIG. 8 is a message diagram illustrating a fault in an LT device or a link between an NT device and an LT device in an exemplary embodiment.

FIG. 8 is a message diagram illustrating a fault in LT device 220 or a link between NT device 210 and LT device 220 in an exemplary embodiment. Due to the fault, the IP multicast stream will not be successfully received in LT device 220 or in ONT device 112. When LT device 220 detects a packet loss in the IP multicast monitoring stream (e.g., one or more packets were not received over the monitoring channel), it reports the packet loss to NT device 210. This report is an alarm to NT device 210 regarding the packet loss for the monitoring channel. NT device 210 then reports the packet loss alarm from LT device 220 to an OSS (e.g., management system 154).

When ONT 112 detects a packet loss in the IP multicast monitoring stream, it reports the packet loss to LT device 220. ONT device 112 sends an OMCI alarm message to LT device 220 indicating the packet loss with an alarm notification. In response to the alarm notification, LT device 220 sends an OMCI message to ONT device 112 requesting packet loss statistics for the monitoring channel. ONT device 112 determines the packet loss rate and/or other statistics for the monitoring channel, and reports the packet loss statistics to LT device 220 in an OMCI response. LT device 220 reports a packet loss to NT device 210 with an alarm notification, and NT device 210 in turn reports the packet loss to the OSS.

Operators isolate the fault considering reports from LT device 220, ONT 112, and other upstream network elements, and fix the fault that caused the packet loss. After the fault(s) is fixed, NT device 210 again transmits the IP multicast monitoring stream on channel 224.0.2.8. LT device 220 monitors the monitoring channel to determine if the packet loss has cleared. For example, if LT device 220 successfully receives packets for the IP multicast stream in sequence for 5 minutes, then LT device 220 may determine that the packet loss has cleared on the monitoring channel. When this occurs, LT device 220 sends a message to NT device 210 indicating that the alarm has cleared. NT device 210 in turn informs the OSS that the alarm has cleared for LT device 220.

ONT device 112 also monitors the monitoring channel to determine if the packet loss has cleared. If ONT device 112 determines that the packet loss has ended for the monitoring stream, then it sends an OMCI message to LT device 220 indicating that the packet loss has cleared (or that the prior alarm notification has cleared). In order for ONT device 112 to report the end of a packet loss, a new attribute is defined for OMCI indicating no packet loss or that packet loss has cleared for the IP multicast monitoring stream. LT device 220 reports that the alarm notification has cleared for ONT device 112, and NT device 210 in turn informs the OSS that the alarm notification has cleared for ONT device 112.

Figure 9:
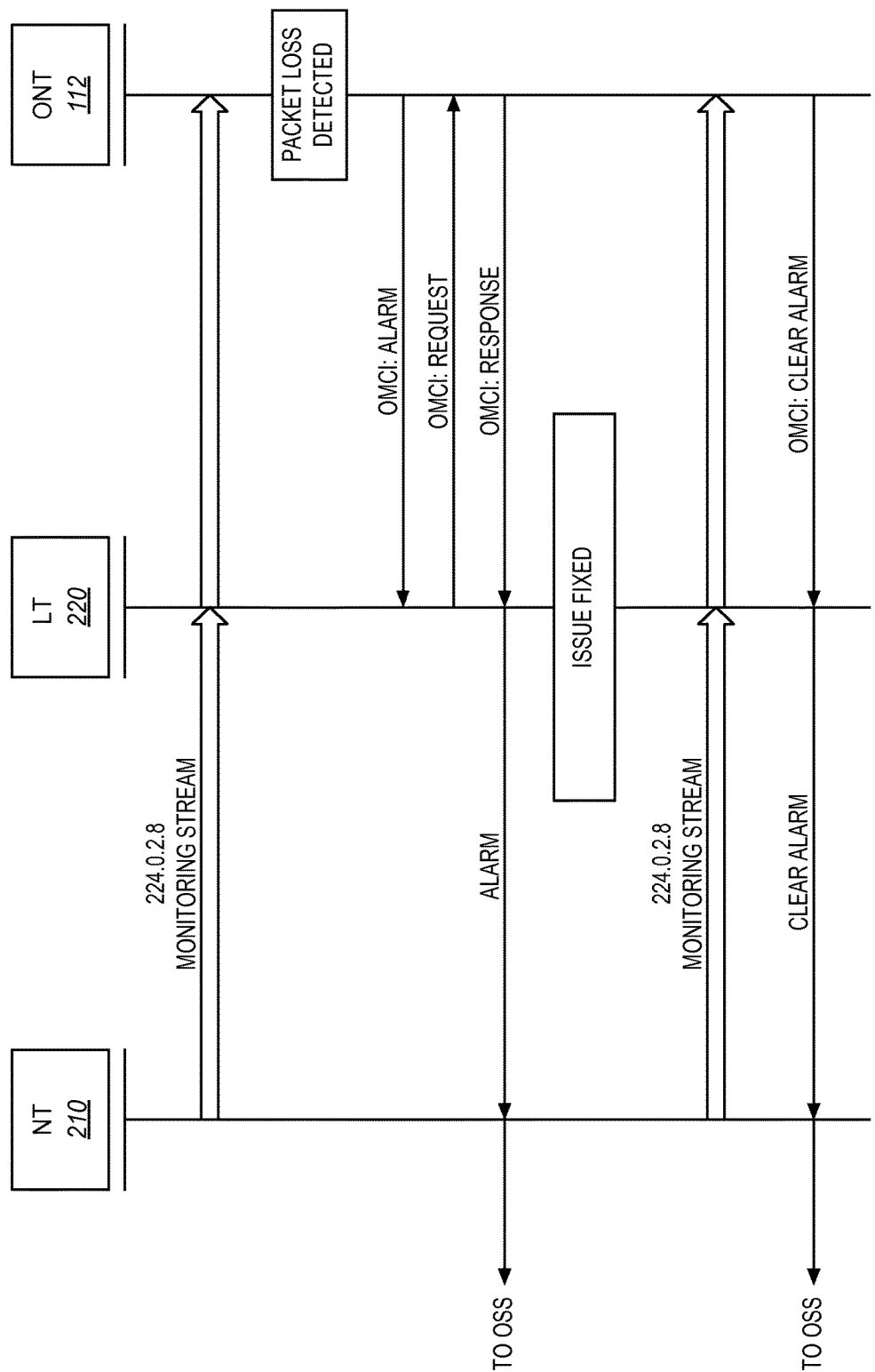
FIG. 9 is a message diagram illustrating a fault in a link between an LT device and an ONT device in an exemplary embodiment.

FIG. 9 is a message diagram illustrating a fault in the link between LT device 220 and ONT device 112 in an exemplary embodiment. Due to the fault, the IP multicast stream will not be successfully received in ONT device 112. When ONT device 112 detects packet loss in the IP multicast monitoring stream, it reports the packet loss to LT device 220. ONT device 112 sends an OMCI message to LT device 220 indicating the packet loss with an alarm notification. In response to the alarm notification, LT device 220 sends an OMCI message to ONT device 112 requesting packet loss statistics for the monitoring channel. ONT device 112 then sends an OMCI response to LT device 220 with the packet loss statistics. LT device 220 reports the packet loss to NT device 210 with an alarm notification, and NT device 210 in turn reports the packet loss to the OSS.

Operators isolate the fault based on the reports from ONT device 112 and other upstream network elements, and fix the fault that caused the packet loss. After the fault(s) is fixed, NT device 210 again transmits the IP multicast monitoring stream on channel 224.0.2.8. LT device 220 forwards the IP multicast monitoring stream to ONT device 112. ONT device 112 monitors channel 224.0.2.8 to determine if the packet loss has cleared. If ONT device 112 determines that the packet loss has ended for the monitoring stream, then it sends an OMCI message to LT device 220 indicating that the packet loss has cleared (or that the prior alarm notification has cleared). LT device 220 reports to NT device 210 that the alarm notification has cleared for ONT device 112, and NT device 210 in turn informs the OSS that the alarm notification has cleared for ONT device 112.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
an Optical Line Termination (OLT) device of an optical network, the OLT device comprising:
    a Network Termination (NT) device configured to connect to a core network; and
    a plurality of Line Termination (LT) devices configured to connect to optical fibers of an optical distribution network, wherein each of the LT devices has multiple links to the NT device;
the NT device includes a monitoring device configured to generate an Internet Protocol (IP) multicast monitoring stream directed to a group address, wherein the IP multicast monitoring stream directed to the group address is used exclusively for monitoring the optical network;
for each of the LT devices, the monitoring device is configured to transmit the IP multicast monitoring stream over each of the multiple links between the NT device and the LT device one at a time for a defined interval;
each of the LT devices is configured to monitor for packets directed to the group address over the multiple links between the NT device and the LT device;
when an individual one of the LT devices detects a loss of at least one packet directed to the group address, the individual one of the LT devices reports packet loss for the IP multicast monitoring stream to the monitoring device.

2. The apparatus of claim 1 wherein:
the individual one of the LT devices is configured to detect, after reporting the packet loss, that packets directed to the group address are successfully received over a time interval, and to report to the monitoring device that the packet loss has ended.

3. The apparatus of claim 1 wherein:
the monitoring device is configured to send a control message to the LT devices indicating the group address for the IP multicast monitoring stream.

4. The apparatus of claim 1 wherein:
the IP multicast monitoring stream is unencrypted; and each of the packets of the IP multicast monitoring stream includes a sequence number and a timestamp.

5. The apparatus of claim 1 wherein:

each of the LT devices is configured to forward the IP multicast monitoring stream over an optical fiber to an Optical Network Termination (ONT) device at a customer premises, to receive a message from the ONT device indicating packet loss for the IP multicast monitoring stream detected by the ONT device, and to report the packet loss detected by the ONT device to the NT device.

6. The apparatus of claim 5 wherein:

each of the LT devices is configured to receive a message from the ONT device indicating that the packet loss has ended for the IP multicast monitoring stream, and to report that the packet loss detected by the ONT device has ended.

7. The apparatus of claim 5 wherein:

an interface between the LT devices and the ONT device comprises an ONT Management and Control Interface (OMCI) defined by the International Telegraph Union Telecommunication Standardization Sector (ITU-T); and the OMCI includes a new attribute for indicating the group address for the IP multicast monitoring stream, and a new attribute for indicating the packet loss detected by the ONT device.

8. A method for monitoring Internet Protocol (IP) multicast delivery in an Optical Line Termination (OLT) device of an optical network, wherein the OLT device includes a Network Termination (NT) device configured to connect to a core network, and a plurality of Line Termination (LT) devices configured to connect to optical fibers of an optical distribution network, the method comprising:

generating, at the NT device, an IP multicast monitoring stream directed to a group address, wherein the IP multicast monitoring stream directed to the group address is used exclusively for monitoring the optical network;

wherein each of the LT devices has multiple links to the NT device;

for each of the LT devices, transmitting the IP multicast monitoring stream over each of the multiple links between the NT device and the LT device one at a time for a defined interval;

at each of the LT devices, monitoring for packets directed to the group address over the multiple links between the NT device and the LT device; and when an individual one of the LT devices detects a loss of at least one packet directed to the group address, reporting packet loss for the IP multicast monitoring stream to the NT device.

9. The method of claim 8 wherein:

after reporting the packet loss, the method further comprises:

detecting, at the individual one of the LT devices, that packets directed to the group address are successfully received over a time interval; and reporting, from the individual one of the LT devices to the NT device, that the packet loss has ended.

10. The method of claim 8 further comprising:

sending a control message from the NT device to the LT devices indicating the group address for the IP multicast monitoring stream.

11. The method of claim 8 wherein:

the IP multicast monitoring stream is unencrypted; and each of the packets of the IP multicast monitoring stream includes a sequence number and a timestamp.

12. The method of claim 8 further comprising:

forwarding the IP multicast monitoring stream from at least one of the LT devices over an optical fiber to an Optical Network Termination (ONT) device at a customer premises;

receiving, at the at least one of the LT devices, a message from the ONT device indicating packet loss for the IP multicast monitoring stream detected by the ONT device; and reporting, from the at least one of the LT devices to the NT device, the packet loss detected by the ONT device.

13. The method of claim 12 further comprising:

receiving, at the at least one of the LT devices, a message from the ONT device indicating that the packet loss has ended for the IP multicast monitoring stream; and reporting, from the at least one of the LT devices to the NT device, that the packet loss detected by the ONT device has ended.

14. The method of claim 12 wherein:

an interface between the LT devices and the ONT device comprises an ONT Management and Control Interface (OMCI) defined by the International Telegraph Union Telecommunication Standardization Sector (ITU-T); and the OMCI includes a new attribute for indicating the group address for the IP multicast monitoring stream, and a new attribute for indicating the packet loss detected by the ONT device.

* * * * *